Dec. 23, 1924.

G. B. PHILLIPS ET AL 1,520,507

FORD TRANSMISSION LOCK

Filed Oct. 9, 1923

INVENTORS
*George B. Phillips and
Alfred A. Clemens*
BY
ATTORNEY

Patented Dec. 23, 1924.

1,520,507

UNITED STATES PATENT OFFICE.

GEORGE B. PHILLIPS AND ALFRED A. CLEMENS, OF SHAWMUT, CALIFORNIA.

FORD TRANSMISSION LOCK.

Application filed October 9, 1923. Serial No. 667,450.

*To all whom it may concern:*

Be it known that we, GEORGE B. PHILLIPS and ALFRED A. CLEMENS, citizens of the United States, residing at Shawmut, county of Tuolumne, and State of California, have invented certain new and useful Improvements in a Ford Transmission Lock; and we do declare the following to be a full, clear, and exact description of the same, reference being had to the accompanying drawings, and to the characters of reference marked thereon, which form a part of this application.

This invention relates to a device for locking the transmission controlling members, i. e., the pedals, of Ford automobiles, our main object being to provide a device of this character so constructed that when applied to the pedals, the engine cannot be cranked or otherwise started, and neither can the car be rolled along the ground either forward or backward.

This object we accomplish by providing a means for locking the clutch and high gear pedal in its normal set or engaged position, and at the same time locking the reverse gear pedal in its set or operative position, causing a relation between the transmission mechanism controlled by the pedals to be had which will positively prevent engine or car movement, as will be appreciated by those understanding the operation of the mechanism in question.

Another and important object of the invention is to provide means for enabling the reverse pedal to be positively moved to a set or locking position regardless of the distance it may have to be moved to properly set it. This distance is apt to vary, since the reverse mechanism includes a brake band which is tightened onto the transmission casing or drum by the movement of the pedal.

If the band-lining is new, it is obvious that the pedal will move through a shorter arc to clamp the band than when the latter is worn. Hence if the locking device were made so as to cause the reverse pedal to be moved only a certain fixed distance, either the band would not be properly clamped if worn, permitting slippage and possible movement of the car, or if the device was made so as to properly set said pedal when the brake lining was old, it would be impossible to move the pedal the same distance necessary to apply the lock if the lining was new. The improved construction of our device in this respect avoids such a contingency, and enables the device to be applied, and the mechanism firmly locked, regardless of the condition of the reverse-band lining.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Figure 1:
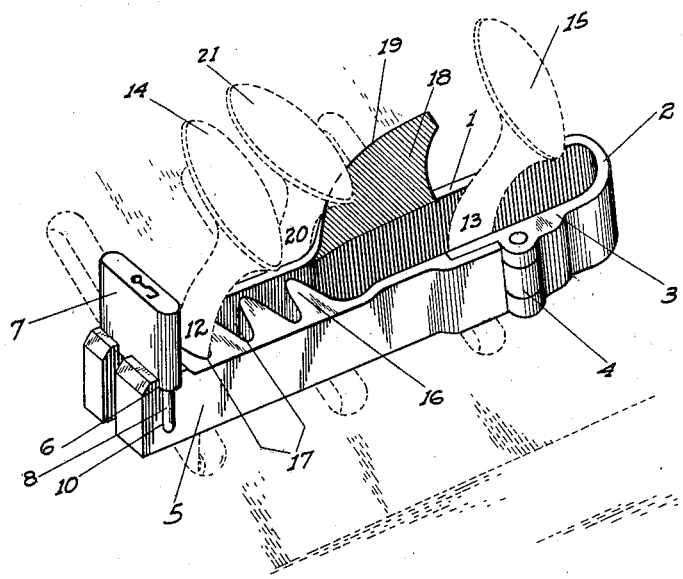
Fig. 1 is a perspective view of the device as applied to the pedals, and in the position it would assume relative to the pedals when the lining of the reverse-band is new.
Figure 2:
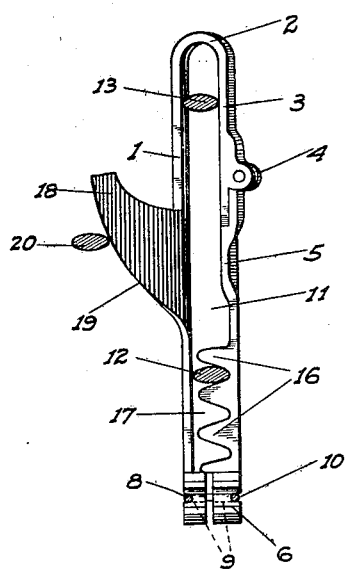
Fig. 2 is a top plan view of the device, showing the positions of the pedal stems when the reverse-band lining is worn.
Figure 3:
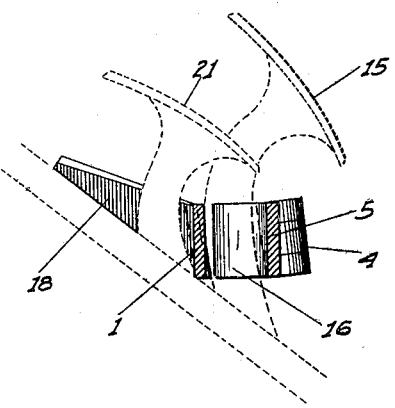
Fig. 3 is a cross section of the device.

Referring now more particularly to the characters of reference on the drawings, the numeral 1 denotes a substantially straight bar disposed in a vertical plane and having at one end a bend 2 terminating in a short portion 3 parallel to the bar 1 and in a common horizontal plane therewith and of course being in spaced relation thereto. Hinged onto the portion 3 as at 4 for swinging movement away from the bar 1 in a horizontal plane is another bar 5, parallel to the bar 1 and terminating in alinement with the free end of said bar.

The upper faces of said free ends of the bars are transversely slotted as at 6 to a certain depth to seat the body 7 of a padlock whose yoke-arms 8 pass through orifices 9 cut through the bars under the slots 6 and up through grooves 10 cut in the opposite faces of the bars and on a sufficient depth to seat said arms therein. In this manner the two bars may be locked together to form a longitudinal enclosure 11 therebetween, and it will be evident that when so locked, the padlock yoke-arms cannot be cut through with a file or hacksaw, since they are countersunk in the metal of the bars.

At the same time we do not wish to limit ourselves to this type of lock, since any form of locking means which will hold the bars together, may be used in place of that shown.

The width of the enclosure 11 is sufficient to easily receive the stems 12 and 13 of the clutch or high gear and brake pedals 14 and 15 respectively therethrough, and the length of said enclosure, between the padlock and the bend 2 at the opposite end, is somewhat greater than the distance betwen said pedals in the transverse plane of the car on which they are mounted, this distance being of course fixed and unchangeable.

Adjacent the lock end of the bar 5 the latter is formed with a plurality of inwardly projecting and spaced lugs 16 leaving sockets 17 therebetween in any one of which the stem 12 may seat, the locking device being thus held immovable longitudinally of itself or transversely of the vehicle.

Projecting outwardly of or ahead of the bar 1 in a predetermined position relative to its ends is a cam member 18 having a curved edge 19 extending in a substantially horizontal plane from a beginning adjacent the bar outwardly and away from the bar toward the right hand end thereof, which is the end having the bend 2 thereon. This curved edge is adapted to bear against the stem 20 of the reverse pedal 21.

In operation, the bars 1 and 5 are swung apart, and the bar 1 inserted between the different pedal stems so that the stem 20 is outwardly or ahead of the bar while the stems 12 and 13 are on the inner or opposite side of the bar. The pedal 21 is then depressed, which movement of course moves the stem 20 ahead of the transverse plane of the pedals 12 and 13, the latter two being left in their normal and rearward positions. The locking device is then moved transversely of the vehicle from right to left until the edge 19 of the cam 18 engages said stem 20. It will be evident that if the band lining of the mechanism controlled by said stem is new, but little movement of the latter relative to the stems 12 and 13 will be necessary to set the reverse, and consequently stem 20 will engage the edge 19 adjacent its inception. In this case, when the bar 5 is then moved to its closing position, the stem 12 will aline with and enter the socket 17 nearest the lock end of said bar, as shown in Fig. 1.

If, however, said brake band lining is worn, the stem 20 will have to be moved further ahead in order to actuate or set the reverse mechanism and hence the said stem will be engaged by the cam-edge 19 nearer the outer end of the same. To do this, the locking device must of course move further to the left than in the previous instance, since it cannot itself be moved forward owing to its engagement with the other pedal stems, whose positions remain fixed. Therefore when the bar 5 is moved to its closing position, the stem 12 will seat in one of the sockets 17 furthest from the lock end of the bars, since the direct spacing between the stems 12 and 20 in a transverse plane is of course constant.

The stem 13 merely projects through the enclosure 11, the length of the latter being sufficient to accommodate said stem irrespective of the shifting of the locking device relative thereto.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. An automobile pedal locking device comprising a structure having openings to receive the stems of the brake and clutch pedals of the car therethrough, and a cam projecting forwardly from said structure and having a vertical edge disposed in a horizontal plane at an angle to the longitudinal plane of the car, the reverse-pedal stem being adapted to abut against said edge at any point in the length thereof, whereby the distance said stem will be moved ahead of the others will be varied.

2. An automobile pedal locking device comprising a structure having openings to receive the stems of the brake and clutch pedals of the car therethrough, and a cam projecting forwardly from said structure and having a vertical edge disposed in a horizontal plane at an angle to the longitudinal plane of the car, the reverse-pedal stem being adapted to abut against said edge at any point in the length thereof, and means provided with the structure for holding the same in fixed position relative to said stem irrespective of the position of the latter along the cam-edge.

3. An automobile pedal locking device comprising a structure having openings to receive the stems of the brake and clutch pedals of the car therethrough, and a cam projecting forwardly from said structure and having a vertical edge disposed in a horizontal plane at an angle to the longitudinal plane of the car, the reverse-pedal stem being adapted to abut against said edge at any point in the length thereof, and means provided with the structure and cooperating with one of the first named stems for holding said structure in a fixed relation to said reverse stem irrespective of the position of the latter on the cam-edge.

4. An automobile pedal locking device comprising a structure having openings to receive the stems of the brake and clutch pedals of the car therethrough, and a cam projecting forwardly from said structure and having a vertical edge disposed in a horizontal plane at an angle to the longitudinal plane of the car, the reverse-pedal stem being adapted to abut against said edge at any point in the length thereof, whereby the distance said stem will be moved ahead of the others will be varied, said structure having a plurality of sockets arranged transversely of the vehicle in any one of which at a time one of the first named stems may seat.

5. An automobile pedal locking device comprising a bar adapted to be placed transversely of the car and to be positioned so that the brake and clutch pedal stem lies ahead of the same, means on said bar for engaging said reverse stem and enabling the same to be moved and held ahead different distances from the other stems, another bar hinged to the first bar and adapted to be moved to enclose the first named stems between the bars, and means formed with said hinged bar and cooperating with one of the enclosed stems for preventing movement of the structure transversely of the car.

6. An automobile pedal locking device comprising a bar adapted to be placed transversely of the car and to be positioned so that the brake and clutch pedal stem lies ahead of the same, means on said bar for engaging said reverse stem and enabling the same to be moved and held ahead different distances from the other stems, another bar hinged onto the first bar and adapted to be moved to enclose the first named stems between the bars, and a plurality of lugs on the hinged bar projecting toward the other bar, sockets being formed between said lugs in any one of which one of the first named stems may seat.

7. An automobile pedal locking device comprising a bar adapted to be placed transversely of the car and to be positioned so that the brake and clutch pedal stems lie behind the bar and the reverse pedal stem lies ahead of the same, a cam projecting forwardly from said bar and having a vertical edge disposed in a horizontal plane at an angle to the longitudinal plane of the car, the reverse-pedal stem being adapted to abut against said edge at any point in the length thereof, another bar hinged onto the first bar and adapted to be moved to enclose the first named stems between the bars, and a plurality of lugs on the hinged bar projecting toward the first bar, sockets being formed between said lugs in any of which one of said first named stems may seat.

In testimony whereof we affix our signatures.

GEORGE B. PHILLIPS.
ALFRED A. CLEMENS.